Patented Nov. 20, 1945

2,389,552

UNITED STATES PATENT OFFICE 2,389,552

MATCH COMPOSITIONS

Arthur H. Sanford, Wilmington, Del., assignor to Hercules Powder Company, Wilmington, Del., a corporation of Delaware No Drawing. Application November 18, 1941, Serial No. 419,585

6 Claims. (Cl. 52—27)

This invention relates to improved match compositions and more particularly to match compositions containing polymerized rosin.

In general, match compositions are comprised mainly of a selection of the following substances:

1. Igniters, such as phosphorus, phosphorus sulfide, and metallic oxides, chromates, chlorates, or nitrates.
2. Bulk fillers, such as starch, diatomaceous earth, finely ground silica, flue dust, etc.
3. Binders to hold the ingredients together, such as glue, starch, dextrine, or other water-soluble adhesive.

Matches containing a selection of the above ingredients suffer from the defect that the ingredients are, for the most part, water-soluble. Hence, these matches are liable to be rendered useless in climates where the relative humidity is high, due to the leaching out of the soluble salts.

To remedy this defect, rosin and synthetic resins have been used as binding agents for match compositions. These binding materials have not proved entirely satisfactory, however. For example, match heads containing ordinary wood or gum rosin of about an 80° C. melting point by the drop method show a tendency to stick together when the matches are packed, and this is especially true in the warmer climates. In this connection, it may be noted that pieces of rosin will coalesce at a room temperature of say 25° C., which is far below the drop melting point of this rosin, and this tendency to coalesce is noticeable in match compositions which contain ordinary wood or gum rosin. Compositions containing synthetic resins have not been entirely satisfactory because of a tendency of the composition to retain water, or because of long drying time, or because of poor burning quality of the resin, or because of the difficulty of adjusting the degree of condensation of the resin to obtain an igniting paste of proper consistency, so that properly-shaped match heads will be produced upon the drying of the paste. Also, condensation products must be used relatively soon after they are prepared, since otherwise further condensation may occur and render the resin useless as a binding material.

Now in accordance with this invention, polymerized rosin is used as a binding material in match compositions. These match compositions result in the production of matches which retain their igniting qualities indefinitely even when kept in a humid atmosphere. When packed, these matches do not adhere together even when stored at the highest temperatures which may be encountered in actual practice. By practicing this invention matches with well-shaped heads and excellent burning properties may be produced with comparative simplicity as compared with previous processes for the manufacture of moisture-repellant matches. The following examples will serve to illustrate how this invention may be practiced:

Example 1

Fifty parts of polymerized rosin of 100° C. drop melting point was dissolved in 50 parts of toluene, and to the solution were added 30 parts of red phosphorus, 20 parts of finely divided silica, and 40 parts of lead dioxide. These ingredients were mixed to form a uniform paste, in which the ends of the match sticks were dipped, after which the matches were permitted to dry by evaporation of the solvent.

Example 2

Fifty parts of polymerized rosin of 115° C. drop melting point was dissolved in 75 parts of benzene, and to the solution were added 3.5 parts of potassium dichromate, 37.0 parts of potassium chlorate, 8.5 parts of glass powder, 0.5 part of zinc oxide, 4.7 parts of manganese dioxide, 3.5 parts of sulfur, 3.8 parts of iron oxide, and 1.0 part of kieselguhr. These ingredients were mixed to form a uniform paste, in which the ends of the match sticks were immersed, after which the matches were permitted to dry by evaporation of the solvent.

Example 3

Fifty parts of polymerized rosin of 120° C. drop melting point was dissolved in 75 parts of carbon tetrachloride, and to the solution were added 3 parts of powdered sulfur, 6 parts of manganese dioxide, 1.5 parts of ferric oxide, 3.8 parts of powdered glass, 2.5 parts of potassium dichromate, and 40 parts of potassium chlorate. These ingredients were mixed to form a uniform paste, in which the ends of the match sticks were dipped, after which the matches were permitted to dry by evaporation of the solvent.

Matches prepared in Examples 1, 2, and 3 were kept at an elevated temperature and a high relative humidity for an extended period of time. The matches were then removed and permitted to cool to room temperature. All of the matches which had been subjected to the humidity treatment lit without difficulty when struck, and exhibited excellent burning qualities after ignition.

Matches prepared in Examples 1, 2, and 3 were packed at an elevated temperature for an extended period of time. The matches exhibited no tendency to stick together after having been subjected to this treatment.

The ingredients of these match compositions containing polymerized rosin as a binder may be varied within wide limits. Sufficient polymerized rosin must be added to the composition to produce the desired amount of resistance to moisture and sticking together in packages. The composition must contain sufficient oxidizing material to insure good ignition and burning qualities, yet the reaction must not proceed too rapidly, or with explosive violence. When the combustion proceeds too rapidly, the entire composition present may be consumed before the match splinter has had a chance to light. Also, the consistency of the paste must be such that properly-shaped heads will result upon drying. The thickness of the paste can be easily adjusted, however, by varying the amount of solvent present or by varying the temperature of the mixture.

The polymerized rosins which may be used in this invention may be those derived from any of the various grades of wood or gum rosin, or the rosins contained therein, such as abietic acid, pimaric acids, sapinic acid, etc. They may be produced from such rosins or rosin acids by polymerization according to any of the known methods, such as, for example, by treatment with various catalysts such as sulfuric acid, organic substituted sulfuric acids, boron trifluoride, metallic halides as zinc chloride, aluminum chloride, hydrofluoric acid, or by treatment of the rosins with a high voltage, high frequency discharge, or by treatment with an acid sludge formed by treatment of rosin with sulfuric acid such as described in application, Serial No. 328,864, filed April 10, 1940, by Clell E. Tyler. The polymerization of rosin by any of the procedures such as mentioned above is carried out usually by treatment of the rosin dissolved in some suitable organic solvent.

The polymerized rosins which are useful in this invention will be those having a drop melting point from about 5° C. to 100° C. above the melting point of the original rosin used in the polymerization. A preferred polymerized rosin has a drop melting point of from about 95° C. to about 120° C. The polymerized rosin described by this and the previous paragraph may be used as a binding material in match compositions for strike-anywhere matches and safety matches, and also may be used in the preparation of striking surfaces.

Any suitable solvent for the polymerized rosin may be used, such as, for example, coal tar hydrocarbons, as benzol, toluol, xylol, etc.; petroleum hydrocarbons, as gasoline, hexane, heptane, etc.; mixed alicyclic aromatic solvents, as tetrahydronaphthalene and decahydronaphthalene; chlorinated solvents, as ethylene dichloride, carbon tetrachloride, tetrachloroethane, etc.; esters as ethyl acetate, butyl acetate, etc.; and ketones, as acetone, methylethyl ketone, etc. The solvent used must tend to dissolve only the rosin to an appreciable extent to prevent separation upon drying. Also, the solvent must be sufficiently volatile so that the paste will not require too long a time to dry.

Compositions prepared as described in the examples and following paragraphs are excellent match compositions. By using match compositions containing polymerized rosin as a binding material, strike-anywhere and safety matches which are highly water-repellant can be produced. The resulting match heads are characterized by great hardness, so that objectionable sticking of matches in warm weather is eliminated, yet the match heads are not brittle. Finally, polymerized rosin, unlike the synthetic resins suitable for match compositions, can be kept indefinitely without deterioration of the suitability of the rosin as a binding agent.

What I claim and desire to protect by Letters Patent is:

1. A match comprising a wooden splint provided with a tip of igniting composition comprising an igniter, a filler and polymerized rosin, the said polymerized rosin being present in an amount sufficient to provide binding action on the igniter and filler and to provide a moisture-resistant and nonsticky tip.

2. A match comprising a wooden splint provided with a tip of igniting composition comprising an igniter, a filler and polymerized rosin having a drop melting point between about 95 and about 120° C., the said polymerized rosin being present in an amount sufficient to provide binding action on the igniter and filler and to provide a moisture-resistant and nonsticky tip.

3. A match comprising a cardboard splint provided with a tip of igniting composition comprising an igniter, a filler and polymerized rosin, the said polymerized rosin being present in an amount sufficient to provide binding action on the igniter and filler and to provide a moisture-resistant and nonsticky tip.

4. A match comprising a cardboard splint provided with a tip of igniting composition comprising an igniter, a filler and polymerized rosin having a drop melting point between about 95 and about 120° C., the said polymerized rosin being present in an amount sufficient to provide binding action on the igniter and filler and to provide a moisture-resistant and nonsticky tip.

5. A match comprising a wooden splint provided with a tip of igniting composition consisting of an igniter, a filler and polymerized rosin having a drop melting point between about 95 and about 120° C., the said polymerized rosin being present in an amount sufficient to provide binding action on the igniter and filler and to provide a moisture-resistant and nonsticky tip.

6. A match comprising a cardboard splint provided with a tip of igniting composition consisting of an igniter, a filler and polymerized rosin having a drop melting point between about 95 and about 120° C., the said polymerized rosin being present in an amount sufficient to provide binding action on the igniter and filler and to provide a moisture-resistant and nonsticky tip.

ARTHUR H. SANFORD.